(12) United States Patent
Emons

(10) Patent No.: US 6,963,987 B1
(45) Date of Patent: Nov. 8, 2005

(54) DATA PROCESSING UNIT WITH ACCESS TO THE MEMORY OF ANOTHER DATA PROCESSING UNIT DURING STANDBY

(75) Inventor: Martijn Johannes Lambertus Emons, Nijmegen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 560 days.

(21) Appl. No.: 09/717,966

(22) Filed: Nov. 21, 2000

(30) Foreign Application Priority Data

Nov. 24, 1999  (EP) ................................. 99203936

(51) Int. Cl.$^7$ ............................................... G06F 1/32
(52) U.S. Cl. ..................................... 713/324; 713/320
(58) Field of Search ................................ 713/320, 323, 713/324; 711/141; 710/22, 62; 714/719

(56) References Cited

U.S. PATENT DOCUMENTS

| | | | | |
|---|---|---|---|---|
| 5,247,639 A | * | 9/1993 | Yamahata | 711/138 |
| 5,481,731 A | * | 1/1996 | Conary et al. | 711/141 |
| 5,530,932 A | * | 6/1996 | Carmean et al. | 713/324 |
| 5,632,038 A | * | 5/1997 | Fuller | 713/324 |
| 5,638,530 A | * | 6/1997 | Pawate et al. | 711/115 |
| 5,669,003 A | * | 9/1997 | Carmean et al. | 713/322 |
| 5,678,021 A | * | 10/1997 | Pawate et al. | 711/104 |
| 5,768,628 A | * | 6/1998 | Priem | 710/62 |
| 5,790,875 A | * | 8/1998 | Andersin et al. | 713/320 |
| 5,809,314 A | | 9/1998 | Carmean et al. | 395/750 |
| 5,845,139 A | * | 12/1998 | Fischer et al. | 713/324 |
| 5,941,968 A | * | 8/1999 | Mergard et al. | 710/308 |
| 5,963,721 A | * | 10/1999 | Shiell et al. | 710/305 |
| 5,968,148 A | * | 10/1999 | Priem | 710/62 |
| 6,105,141 A | * | 8/2000 | Hanlon et al. | 713/323 |
| 6,128,747 A | * | 10/2000 | Thoulon | 713/330 |
| 6,134,609 A | * | 10/2000 | Klein | 710/52 |
| 6,185,704 B1 | * | 2/2001 | Pawate et al. | 714/719 |
| 6,266,776 B1 | * | 7/2001 | Sakai | 713/300 |
| 6,292,854 B1 | * | 9/2001 | Priem | 710/22 |
| 6,347,294 B1 | * | 2/2002 | Booker et al. | 703/28 |
| 6,381,636 B1 | * | 4/2002 | Cromer et al. | 709/211 |
| 6,523,128 B1 | * | 2/2003 | Stapleton et al. | 713/330 |
| 6,584,588 B1 | * | 6/2003 | Pawate et al. | 714/719 |

FOREIGN PATENT DOCUMENTS

| | | | | |
|---|---|---|---|---|
| WO | WO9515528 | 6/1995 | | G06F 13/18 |
| WO | WO9900741 | 1/1999 | | G06F 13/16 |

OTHER PUBLICATIONS

Bajwa et al., "Instruction Buffering to Reduce Power in Processors for Signal Processing" IEEE Transactions on Very Large Scale Integration (VLSI) System, vol. 5, No. 4, Dec. 1997, pp 417-424.*

* cited by examiner

Primary Examiner—Chun Cao
(74) Attorney, Agent, or Firm—Aaron Waxler

(57) ABSTRACT

In a reduced power mode a first data processing unit forming part of a data processing system offers a second data processing unit access to its associated memory in order to optimize the use of energy and available resources. The first data processing unit requires reduced storage space in the reduced power mode, which remaining storage space can be made available to the second data processing unit. The memory associated to the second data processing unit can be switched off to save energy, or can be removed altogether if the second data processing unit only operates in the reduced power mode.

17 Claims, 2 Drawing Sheets

DATA PROCESSING UNIT WITH ACCESS TO THE MEMORY OF ANOTHER DATA PROCESSING UNIT DURING STANDBY

The invention relates to a data processing system which may be situated in a reduced-power mode, comprising a first data processing unit that has access to a memory belonging to the first data processing unit and a second data processing unit that has access to the memory belonging to the first data processing unit.

The invention also relates to a data processing unit that may be situated in a reduced-power mode and has access to a memory belonging to the data processing unit.

An arrangement of this type is known from WO 99/00741. A multifunction controller is described herein to be used in a personal computer, which includes a unified graphics/video controller. The unified graphics/video controller processes the data intended for the user into a signal that is suitable for reproduction by a display unit. The data for the unified video controller is supplied by the CPU (Central Processing Unit). The CPU can write the data in the memory belonging to the unified graphics/video controller, supply it via a register structure or render it available in the memory belonging to the CPU after which the unified graphics/video controller can fetch the data from the memory belonging to the CPU. After the unified graphics/video controller has the data at its disposal, it is processed by means of the memory belonging to the unified graphics/video controller. In WO 99/00741, the exchange of this data is effected by a communication link and a combined PCI bridge and a cache controller as a result of which the unified graphics/video controller has access to the cache memory that belongs to the CPU.

A disadvantage of this arrangement is that when a picture is still to be reproduced via the unified graphics/video controller in a reduced-power mode of the system, an unnecessarily large part of the data processing system is to remain active, leading to an unnecessarily large energy consumption.

It is an object of the invention to further reduce the energy consumption of a reduced-power mode data processing unit by efficiently utilizing the available system components.

For this purpose, the arrangement according to the invention is characterized in that the first data processing unit is arranged for offering the second data processing unit access to the memory belonging to the first data processing unit in a reduced-power mode of the data processing system.

In a reduced-power mode of the data processing system, the second data processing unit is often to process information, it is true, but the quantity and exchange of information is usually limited. The first data processing unit is only to execute a reduced number of tasks in the reduced-power mode, so that part of the memory belonging to the first data processing unit remains unused. By using the memory belonging to the first data processing unit for storing data of the second data processing unit in the reduced-power mode, the use of the second data processing unit's own memory may be avoided and the system components can be made optimum use of.

The memory belonging to the first data processing unit may furthermore fit better as regards capacity with the quantity of data produced in the reduced-power mode and to be processed by the second data processing unit, or may form part of a system component that is not used in the reduced-power mode, but is not switched off either. If the second data processing unit is to process data only in the reduced-power mode, a memory of its own for the second data processing unit may be omitted.

All this results in an efficient use of the available system components and reduced energy consumption.

An embodiment of the invention is characterized in that the first data processing unit is arranged for offering access to the memory belonging to the first data processing unit during a reduced-power mode of the first data processing unit.

For the time when the first data processing unit is situated in a reduced-power mode, the memory belonging to the first data processing unit is normally not used. By utilizing this unused memory, the use of the second data processing unit's own memory is avoided, which results in an efficient use of the system components and reduced energy consumption.

A further embodiment of the invention is characterized in that the first data processing unit is arranged for offering access to the memory belonging to the first data processing unit to the second data processing unit when a memory belongs to the second data processing unit is switched off.

In the reduced-power mode, as many components as possible of the data processing system are to be switched off to provide optimum energy consumption. By switching off the memory belonging to the second data processing unit in the reduced-power mode and offering the second data processing unit access to the memory belonging to the first data processing unit, the energy consumption of the data processing system is reduced and the second data processing unit may continue to execute a reduced set of tasks with the aid of the memory belonging to the first data processing unit. The memory belonging to the first data processing unit may, for example as regards capacity, fit better with the reduced quantity of data to be processed in the reduced-power mode, or be part of a system component that is not used in the reduced-power mode but is not switched off either.

The invention will be further explained with reference to drawings in which.

In these Figures the data processing unit is shown in the form of a microprocessor. Other data processing units too, such as a digital signal processor, may be used.

Figure 1:
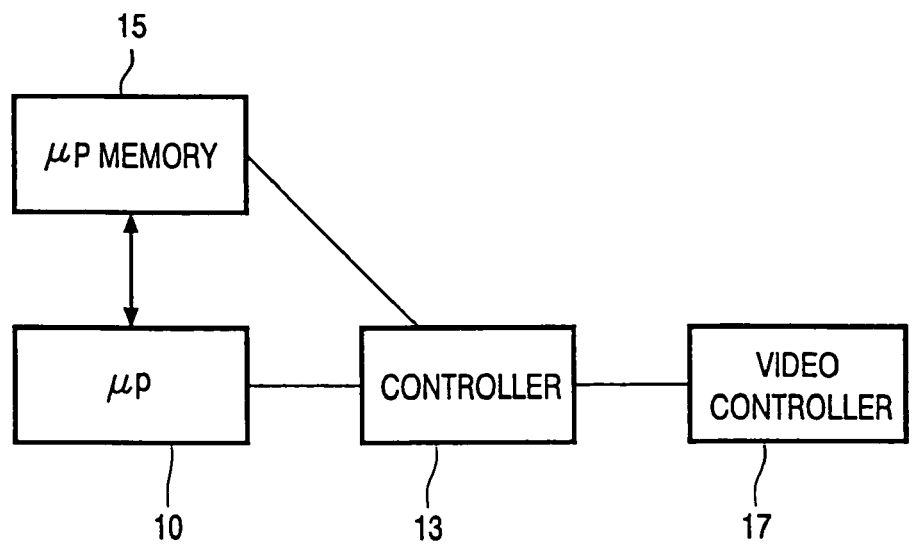
FIG. 1 represents a system in which a controller controls the interaction between the various system components.

FIG. 1 shows a data processing system comprising a microprocessor 10, a memory 15 belonging to the microprocessor, a controller 13 controlling the interaction between the system components and a video controller 17. This system may be situated in a reduced-power mode.

In the reduced-power mode it is important to make optimum use of the various system components. In the reduced-power mode the video controller 17 often reproduces a limited quantity of information. This requires a memory in which this information is stored. By utilizing the memory 15 belonging to the microprocessor 10, the use of a memory of its own of the video controller 17 can be avoided. The microprocessor 10 in the reduced mode is less active or inactive, which results in a reduced use of the memory 15. The capacity of the memory 15 that is vacated may be used by the video controller 17. If the microprocessor 10 is switched off in the reduced-power mode, the whole part of the memory 15 that is assigned to the microprocessor 10 becomes available to the video controller 17.

When the video controller 17 reproduces data only in the reduced-power mode, the memory 15 will suffice as the sole memory for the video controller 17, because in the normal-power mode the video controller 17 does not need a memory and the memory 15 is thus again completely available to the microprocessor 10.

Figure 2:
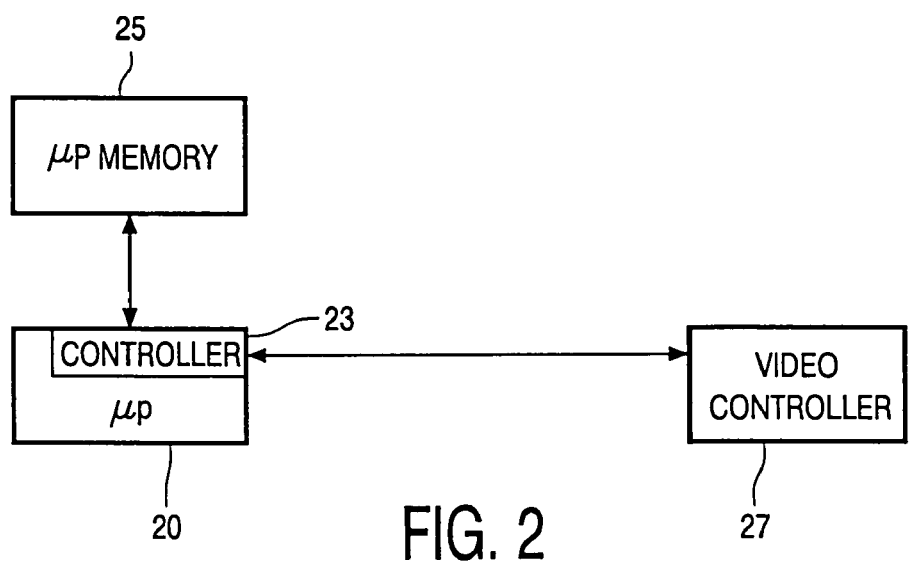
FIG. 2 represents a system in which the video controller utilizes the external memory of a microprocessor.

FIG. 2 shows a data processing system comprising a microprocessor 20, a video controller 27, an external memory 25 belonging to the microprocessor, and a controller 23 included in the microprocessor 20. The controller 23 controls, possibly commanded by the microprocessor 20, the access to the memory 25 belonging to the microprocessor 20. By keeping parts of the microprocessor 20, among which the controller 23, in an active state, so that the video controller 27 can utilize the memory 25 belonging to the microprocessor 20 in the reduced-power mode, the use of a memory of its own belonging to the video controller 27 can be avoided. In the reduced-power mode, for example, the microprocessor 20 can be switched off, whereas the access to the memory 25 is maintained for the video controller 27. As a result, the energy consumption is reduced and the system components are made optimum use of. When video controller 27 reproduces data only in the reduced-power mode, the memory 25 will suffice as the sole memory for the video controller 27, because the video controller 27 in the normal-power mode does not need any memory and the memory 25 is thus again completely at the disposal of the microprocessor 20.

Figure 3:
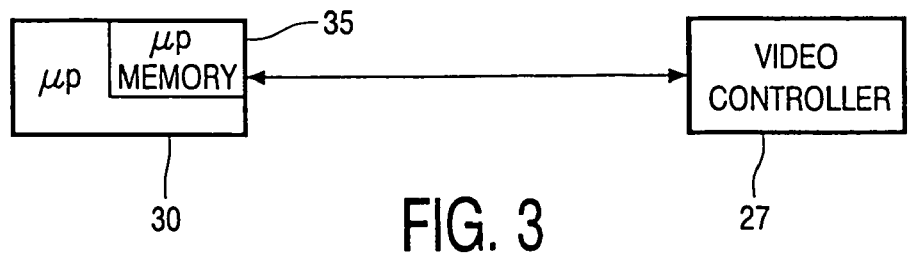
FIG. 3 represents a system in which the video controller utilizes the internal memory of a microprocessor.

FIG. 3 shows a data processing system comprising a video controller 27, a microprocessor 30 including a memory 35 inside the microprocessor 30, which memory is accessible to the video controller 37 from the exterior in the reduced-power mode. The microprocessor 30 is not switched off in some systems, but needs to execute only a minimum set of tasks. To this end, the microprocessor 30 needs to have only a small portion of the memory 35, whereas yet the whole memory 35 is to be supplied with energy. By allowing the video controller 37 to make use of the unused part of the memory 35, the use of an additional memory belonging to the video controller 37 can be avoided. As a result, also the energy consumption associated to the memory belonging to the video controller 17 is avoided and optimum use is made of the available system components.

Figure 4:
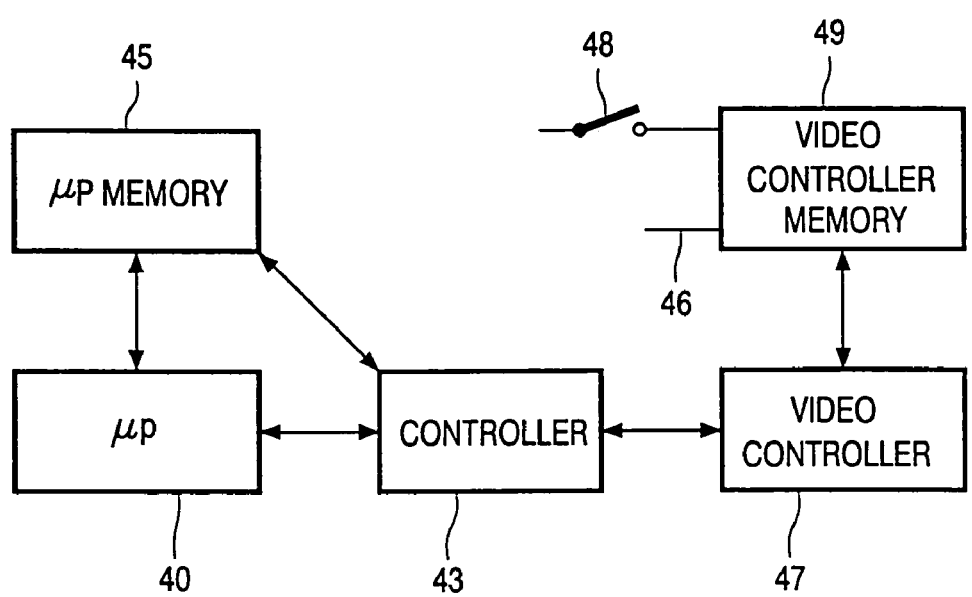
FIG. 4 represents a system in which the video controller has the disposal of a memory of its own, but utilizes the memory of the microprocessor in the reduced-power mode.

FIG. 4 shows a data processing system comprising a microprocessor 40, a controller 43, a memory 45 belonging to the microprocessor, a video controller 47, a memory 49 belonging to the video controller 47, and a switch 48 for interrupting the energy supply to the memory 49.

In the reduced-power mode the controller 43 offers the video controller 47 access to the memory 45 belonging to the microprocessor 40. The memory 45 has sufficient storage capacity for the data of the video controller 47 in the reduced-power mode. The memory 49 belonging to the video controller 47 is no longer necessary in the reduced-power mode and can be switched off by a switch 49 or a power-down pin 46, so that there is a reduction of energy consumption. The switching-off of the memory 49 belonging to the video controller 47 may be combined with the improvements shown in FIGS. 1, 2 and 3.

What is claimed is:

1. A data processing system which is adapted to function in a reduced-power mode, comprising:
   a first data processing unit that has access to a memory belonging to the first data processing unit; and,
   a second data processing unit having its own memory, said second data processing unit having access to the memory belonging to the first data processing unit, wherein the first data processing unit is arranged for offering the second data processing access to the memory belonging to the first data processing unit in a reduce-power mode of the data processing system so that the second data processing unit utilizes the memory belonging to the first data processing unit instead of its own switched-off memory.

2. The data processing system as claimed in claim 1, wherein the first data processing unit is arranged for offering the second data processing unit access to the memory belonging to the first data processing unit in a period of time in which the reduced-power mode of the data processing system implies a reduced-power mode of the first data processing unit.

3. The system as claimed in claim 1, wherein the second data processing unit is a video controller.

4. The system as claimed in claim 1,
   wherein the memory belonging to the first data processing unit forms part of the first data processing unit.

5. The system as claimed in claim 1, wherein the memory belonging to the first data processing unit is a cache memory.

6. The system as claimed in claim 1, wherein the first data processing unit is a microprocessor.

7. A data processing system situated in a reduced-power mode, comprising:
   a first data processing unit that has access to a memory belonging to the first data processing unit, wherein the first data processing unit is arranged for offering a second data processing unit access to the memory belonging to the first data processing unit, and wherein the first data processing unit is arranged for offering the second data processing unit access to the memory belonging to the first data processing unit when a memory belonging to the second data processing unit is switched off.

8. A data processing unit having access to a memory belonging to the data processing unit that may be situated in a reduced-power mode,
   a mechanism that allows the first data processing unit to offer a second data processing unit access to the memory belonging to the first data processing unit in the reduce-power mode, wherein the first processing unit is arranged for offering the second data processing unit access to the first memory when the second memory is switched off.

9. A data processing system that may be situated in a reduced-power mode having a first data processing unit that has access to a first memory associated with the first data processing unit and a second data processing unit that has access to the first memory, said system comprising:
   a second memory operating in a switched-off state associated with the second data processing unit; and
   a mechanism that allows the first data processing to offer the second data processing unit access to the memory belonging to the first data processing unit in a reduced-power mode of the data processing system so that the second data processing unit does not access the second memory during reduced power mode when the first memory can service the second data processing unit.

10. The data processing system as claimed in claim 9, wherein the second memory unit can be accessed by system components other that the fist or second data processing units in the reduced-power mode.

11. A data processing system which may be situated in a reduced-power mode having a first data processing unit that has access to a first memory associated with the first data processing unit and a second data processing unit that has access to the first memory comprising:
- a second memory associated with the second data processing unit; and
- a mechanism that allows the first data processing unit to offer the second data processing unit access to the memory belonging to the first data processing unit in a reduced-power mode of the data processing system, wherein the first data processing unit is arranged for offering the second data processing unit access to the first memory when the second memory is switched off.

12. The system as claimed in claim 11 wherein the memory belonging to the first data processing unit forms part of the first data processing unit.

13. The system as claimed in claim 11, wherein the memory belonging to the first data processing unit is a cache memory.

14. The system as claimed in claim 11, wherein the first data processing unit is a microprocessor.

15. The system as claimed in claim 11, wherein the second data processing unit is a video controller.

16. A data processing system comprising:
- a first processor in communication with a memory, the first processor operating in a reduced-power mode and accessing a selected portion of a first memory; and
- a video controller arranged to access unselected portions of the first memory belonging to the first processor, the video controller further assessing a second memory associated with the video controller, wherein the video controller is inhibited from accessing the second memory.

17. The data processing system as claimed in claim 16, wherein an energy supply to a video controller memory is interrupted.

\* \* \* \* \*